(12) United States Patent
Ahmed et al.

(10) Patent No.: US 9,626,593 B2
(45) Date of Patent: Apr. 18, 2017

(54) SYSTEM AND METHOD FOR CONFLATING ROAD DATASETS

(71) Applicant: Google Inc., Mountain View, CA (US)

(72) Inventors: Mustaq Ahmed, Waterloo (CA); James Rose, San Francisco, CA (US); James Jeffrey Shuma, San Jose, CA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 14/617,985

(22) Filed: Feb. 10, 2015

(65) Prior Publication Data

US 2015/0242674 A1    Aug. 27, 2015

Related U.S. Application Data

(60) Provisional application No. 61/944,592, filed on Feb. 26, 2014.

(51) Int. Cl.
| | |
|---|---|
| G06K 9/00 | (2006.01) |
| G06K 9/62 | (2006.01) |
| G06T 17/05 | (2011.01) |
| G01C 21/32 | (2006.01) |
| G06T 11/20 | (2006.01) |

(52) U.S. Cl.
CPC ........... *G06K 9/6204* (2013.01); *G01C 21/32* (2013.01); *G06K 9/00637* (2013.01); *G06T 11/203* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 5,546,107 A | 8/1996 | Deretsky et al. | |
| 6,782,319 B1 * | 8/2004 | McDonough | G01C 21/32 |
| | | | 701/461 |

(Continued)

OTHER PUBLICATIONS

Rose, Kenneth, et al. "Developable surfaces from arbitrary sketched boundaries." SGP'07—5th Eurographics Symposium on Geometry Processing. Eurographics Association, 2007.*

(Continued)

*Primary Examiner* — Tahmina Ansari
(74) *Attorney, Agent, or Firm* — Dority & Manning, P.A.

(57) ABSTRACT

In one aspect, a computer-implemented method for conflating a base dataset with a secondary dataset may generally include defining a locker boundary around each of a plurality of base polylines of the base dataset and identifying a plurality of initial matched segments and a plurality of initial mismatched segments for a plurality of secondary polylines of the secondary dataset, wherein each portion of the secondary polylines that is included within a locker boundary is defined as an initial matched segment and each portion of the secondary polylines that is not included within a locker boundary is defined as an initial mismatched segment. The method may also include identifying an offset parameter defined between a first initial matched segment and its corresponding base polyline using a three-vertex approximation and, if the offset parameter exceeds a predetermined offset threshold, defining the first initial matched segment as a mismatched segment.

23 Claims, 12 Drawing Sheets

(56) References Cited

U.S. PATENT DOCUMENTS

| | | | |
|---|---|---|---|
| 7,096,117 B1* | 8/2006 | Gale | G01C 21/32 340/995.18 |
| 7,660,441 B2 | 2/2010 | Chen et al. | |
| 9,020,986 B1* | 4/2015 | Pilloff | G01C 21/32 707/812 |
| 9,116,917 B1* | 8/2015 | Ekwall | G06F 17/30241 |
| 2005/0027445 A1* | 2/2005 | McDonough | G01C 21/32 701/532 |
| 2012/0065878 A1* | 3/2012 | Yeh | G09B 29/007 701/400 |
| 2013/0218465 A1* | 8/2013 | Strassenburg-Kleciak | G01C 21/3461 701/533 |
| 2013/0328861 A1 | 12/2013 | Arikan et al. | |
| 2014/0267236 A1* | 9/2014 | Kontkanen | G06T 17/05 345/419 |
| 2014/0348433 A1* | 11/2014 | Zhu | G06K 9/6201 382/217 |
| 2015/0242674 A1* | 8/2015 | Ahmed | G06K 9/00637 382/113 |

OTHER PUBLICATIONS

Heipke et al., "Evaluation of Automatic Road Extraction", International Archives of the Photogrammetry, Remote Sensing and Spatial Information Sciences, vol. 32, Part 3-4W2, pp. 47-56.

International Search Report and Written Opinion issued on Sep. 11, 2015, for International Patent Application No. PCT/US2015/015109, filed Feb. 10, 2015, 9 pages.

* cited by examiner

SYSTEM AND METHOD FOR CONFLATING ROAD DATASETS

FIELD

The present subject matter relates generally to data conflation and, more particularly, to a system and method for fully or partially automatically conflating datasets, such as road datasets.

BACKGROUND

Maintaining up-to-date mapping data is typically a challenging issue for a provider of a geographic information system (GIS), particularly when the data is received in "bulk" form. In particular, conflating the bulk data with the existing map data often presents a significant engineering challenge. For example, for map features having complex geometries, such as polylines and polygons (e.g., road networks, rivers, parks, etc.), fully automated data conflation has proven to be extremely difficult. This is particularly true for road network data for which even a minor glitch by the fully automated process has the potential to significantly degrade user experience. In contrast, a fully manual conflation process is typically very accurate, but is not time or cost effective.

SUMMARY

Aspects and advantages of embodiments of the invention will be set forth in part in the following description, or may be obvious from the description, or may be learned through practice of the embodiments.

In one aspect, the present subject matter is directed to a computer-implemented method for conflating a base dataset with a secondary dataset. The base dataset may include a plurality of base polylines and the secondary dataset may include a plurality of secondary polylines. The method may generally include defining a locker boundary around each of the base polylines and identifying a plurality of initial matched segments and a plurality of initial mismatched segments for the secondary polylines, wherein each portion of the secondary polylines that is included within one of the locker boundaries is defined as an initial matched segment and each portion of the secondary polylines that is not included within one of the locker boundaries is defined as an initial mismatched segment. The method may also include identifying a segment split within the secondary polylines, wherein the segment split corresponds to an initial matched segment that extends from at least one initial mismatched segment defined along the same secondary polyline. In addition, the method may include comparing a segment length of the segment split to a threshold length and, if the segment length is less than the threshold length, re-defining the segment split as a mismatched segment.

In another aspect, the present subject matter is directed to a computer-implemented method for conflating a base dataset with a secondary dataset. The base dataset may include a plurality of base polylines and the secondary dataset may include a plurality of secondary polylines. The method may generally include defining a locker boundary around each of the base polylines and identifying a plurality of initial matched segments and a plurality of initial mismatched segments for the secondary polylines, wherein each portion of the secondary polylines that is included within one of the locker boundaries is defined as an initial matched segment and each portion of the secondary polylines that is not included within one of the locker boundaries is defined as an initial mismatched segment. The method may also include identifying a segment gap within the secondary polylines, wherein the segment gap corresponds to an initial mismatched segment that extends from at least one initial matched segment defined along the same secondary polyline. The method may also include comparing a segment length of the segment gap to a threshold length and, if the segment length is less than the threshold length, re-defining the segment gap as a matched segment.

In a further aspect, the present subject matter is directed to a computer-implemented method for conflating a base dataset with a secondary dataset. The base dataset may include a plurality of base polylines and the secondary dataset may include a plurality of secondary polylines. The method may generally include defining a locker boundary around each of the base polylines and identifying a plurality of initial matched segments and a plurality of initial mismatched segments for the secondary polylines, wherein each portion of the secondary polylines that is included within one of the locker boundaries is defined as an initial matched segment and each portion of the secondary polylines that is not included within one of the locker boundaries is defined as an initial mismatched segment. The method may also include identifying an offset parameter defined between a first initial matched segment of the initial matched segments and a corresponding base polyline of the base polylines using a three-vertex approximation and, if the offset parameter exceeds a predetermined offset threshold, defining the first initial matched segment as a mismatched segment.

Other exemplary aspects of the present disclosure are directed to other methods, systems, apparatus, non-transitory computer-readable media, user interfaces and devices for conflating datasets.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Figure 1:
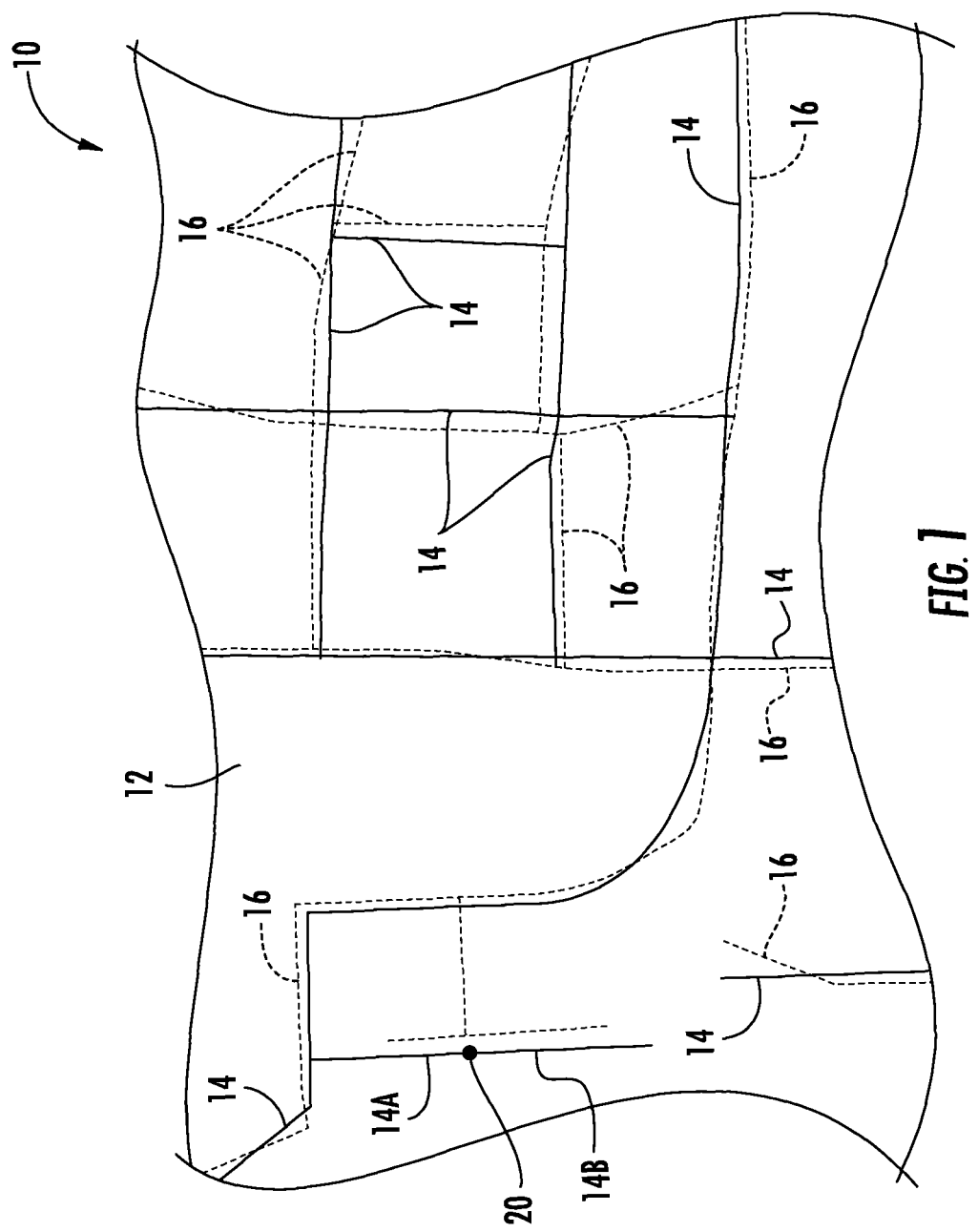
FIG. 1 illustrates an example roadmap view including both a base road dataset (indicated by solid lines) and a secondary road dataset (indicated by dashed lines) to be conflated with the base road dataset.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

Overview

In general, the present subject matter is directed to computer-implemented methods and related systems for conflating datasets. Specifically, in several embodiments, existing geospatial asset data for use within a geographic information system (GIS) (or within any other suitable system) may include a base road dataset having a plurality of geo-coded base polylines corresponding to road segments extending within a geographic area. To ensure that the base road dataset is accurate, it is often desirable to integrate or conflate the base road dataset with one or more different datasets including a plurality of potentially related polylines (such dataset(s) being referred to herein as a "secondary road dataset(s)"). For example, to ensure that the base road dataset is up-to-date (e.g., to ensure that new roads are included within the dataset and/or to remove closed roads from the dataset), the base road dataset may be conflated with a more recently obtained secondary road dataset. As indicated above, such conflation between differing datasets is often quite challenging and/or time consuming. However, the present subject matter provides methods (and related systems) that allow for all or a portion of the conflation process to be performed automatically, thereby reducing engineering time and creating a more efficient process.

For example, FIG. 1 illustrates an example rendered map view 10 of geospatial road data representing a portion of a road network extending across a given geographic area 12, specifically illustrating the geospatial road data including two different road datasets. As shown in FIG. 1, the geospatial road data includes a base road dataset (indicated by the solid lines) including a plurality of geo-coded base polylines 14 representing a plurality of the roads included within the illustrated geographic area 12. Additionally, the geospatial road data includes a secondary road dataset (indicated by the dashed lines) including a plurality of geo-coded secondary polylines 16 that may potentially be related to or associated with the roads represented by the base polylines 14. As will be described below, such datasets may be conflated using a geometric canonicalization process that allows for the various line segments defined by the secondary polylines 16 to be labeled as similar or dissimilar to corresponding line segments defined by the base polylines 14, thereby allowing the polylines 14, 16 included within the road datasets to be efficiently and effectively matched with one another.

It should be appreciated that the present subject matter will generally be described herein with reference to conflating road datasets. However, the disclosed methods and related systems may generally be utilized to conflate any two datasets, regardless of the underlying data type.

It should also be appreciated that the technology described herein makes reference to computing devices, databases, software applications, and/or other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Example Systems for Conflating Road Datasets

Figure 2:
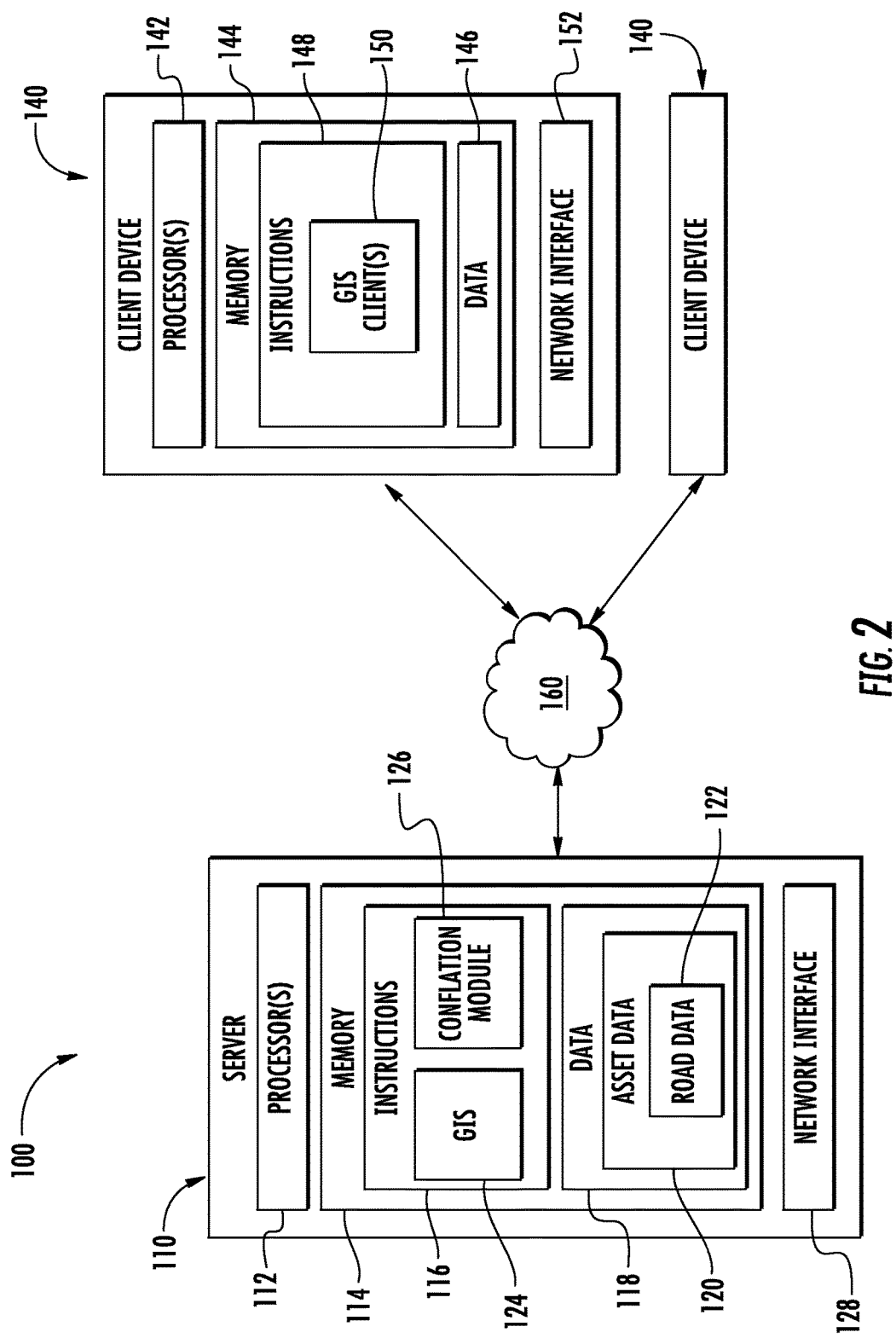
FIG. 2 illustrates a schematic view of one embodiment of a system for conflating datasets in accordance with aspects of the present subject.

Referring now to FIG. 2, one embodiment of a system 100 for conflating datasets is illustrated in accordance with aspects of the present subject matter. As shown in FIG. 2, the system 100 may include a client-server architecture where a server 110 communicates with one or more clients, such as a local client device 140, over a network 160. The server 110 may generally be any suitable computing device, such as a remote web server(s) or a local server(s), and/or any suitable combination of computing devices. For instance, the server 110 may be implemented as a parallel or distributed system in which two or more computing devices act together as single server. Similarly, the client device 140 may generally be any suitable computing device(s), such as a laptop(s), desktop(s), smartphone(s), tablet(s), mobile device(s), wearable computing device(s), a display with one or more processors coupled thereto and/or embedded therein and/or any other computing device(s). Although only two client devices 140 are shown in FIG. 2, it should be appreciated that any number of clients may be connected to the server 110 over the network 160.

In several embodiments, the server 110 may host a GIS 124, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS 124. For instance, the user interface may be served through a network or web-based application that is executed on the client device 140, such as a web browser, a thin client application or any other suitable network or web-based application or the user interface may be served locally on the client device 140. The server 110 may transmit geospatial asset data, such as satellite and/or aerial imagery and other geospatial data (e.g., terrain and vector data, including road data), over the network 160 to the client device 140. Upon receipt of this data, the client device 140 may render the asset data, via the user interface, in the form a map (e.g., 2-D map or a 3-D globe) that is displayed on a display device associated with the client device 140. A user may then access and/or interact with the map presented in the user interface.

As shown in FIG. 2, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 2, the memory 114 may include an asset database 120 storing asset data associated with one or more geospatial assets capable of being served to the client device 140 by the server 110 (e.g., via the GIS 124). For instance, the asset data may correspond to any suitable data or information associated with a given geospatial asset, such as image data, vector data, terrain data, layer data, search data and/or the like. Specifically, as shown in FIG. 2, such asset data may, for example, include road data 122 associated with rendering, locating, searching and/or displaying roads and/or other travelways within a given geospatial asset provided by the server 110.

Additionally, as indicated above, the server 110 may, in several embodiments, be configured to host a GIS 124 that allows the server to communicate with a corresponding GIS client(s) 150 running on the client device 140. Thus, in response to access requests transmitted by the client device 140, asset data associated with one or more geospatial assets, including satellite and/or aerial imagery, may be transmitted to and rendered by the client device 140 to allow a user to navigate and/or interact with the geospatial asset(s).

As shown in FIG. 2, in several embodiments, the instructions 116 stored within the memory 114 may be executed by the processor(s) 112 to implement a conflation module 126. In general, the conflation module 126 may be configured to allow for one or more aspects of a data conflation process to be automated, thereby reducing the overall time and costs associated with such process. For instance, the conflation module 126 may be configured to receive two separate datasets as inputs, such as a base road dataset and a secondary road dataset. The conflation module 126 may then be configured to perform a geometric canonicalization (e.g., using the method(s) 200 described below with reference to FIGS. 3 and 4) to allow the polylines contained within the base road dataset (e.g., base polylines 14 of FIG. 1) to be matched with corresponding polylines contained within the secondary road dataset (e.g., secondary polylines 16 of FIG. 1). As such, the resulting output from the conflation module 126 may include a dataset of line segments from the secondary road dataset that is linked to corresponding line segments in the base road dataset (i.e., "matched" line segments) and a dataset of line segments from the secondary road dataset that are not associated with any of the line segments included within the base road dataset (i.e., "mismatched" line segments). Such output may then be processed further, if necessary, to finalize the conflation process, such as by having personnel manually perform any tasks related to the matched line segments and/or mismatched line segments that require human judgment. However, for certain base and secondary datasets (e.g. when the datasets have near-perfect relative alignment), the disclosed system and method may allow for the data conflation process to be fully automated, thereby eliminating the need for further processing of the data.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

As shown in FIG. 2, the server 110 may also include a network interface 128 for providing communications over the network 160. In general, the network interface 128 may be any device/medium that allows the server 110 to interface with the network 160.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

The instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 150, such as one or more earth-browsing clients and/or mapping clients, designed to render the asset data (including satellite and/or aerial imagery) associated with the geospatial assets available via the GIS 124. For instance, the GIS client(s) 150 may be configured to retrieve asset data (including road data) from the server 110 and render such data in the form of a map(s) for display/use by the user.

Moreover, as shown in FIG. 2, the client device 140 may also include a network interface 152 for providing communications over the network 160. Similar to the interface 128 for the server 110, the network interface 152 may generally be any device/medium that allows the client device 140 to interface with the network 160.

It should be appreciated that the network 160 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Methods for Conflating Datasets

Figure 3:
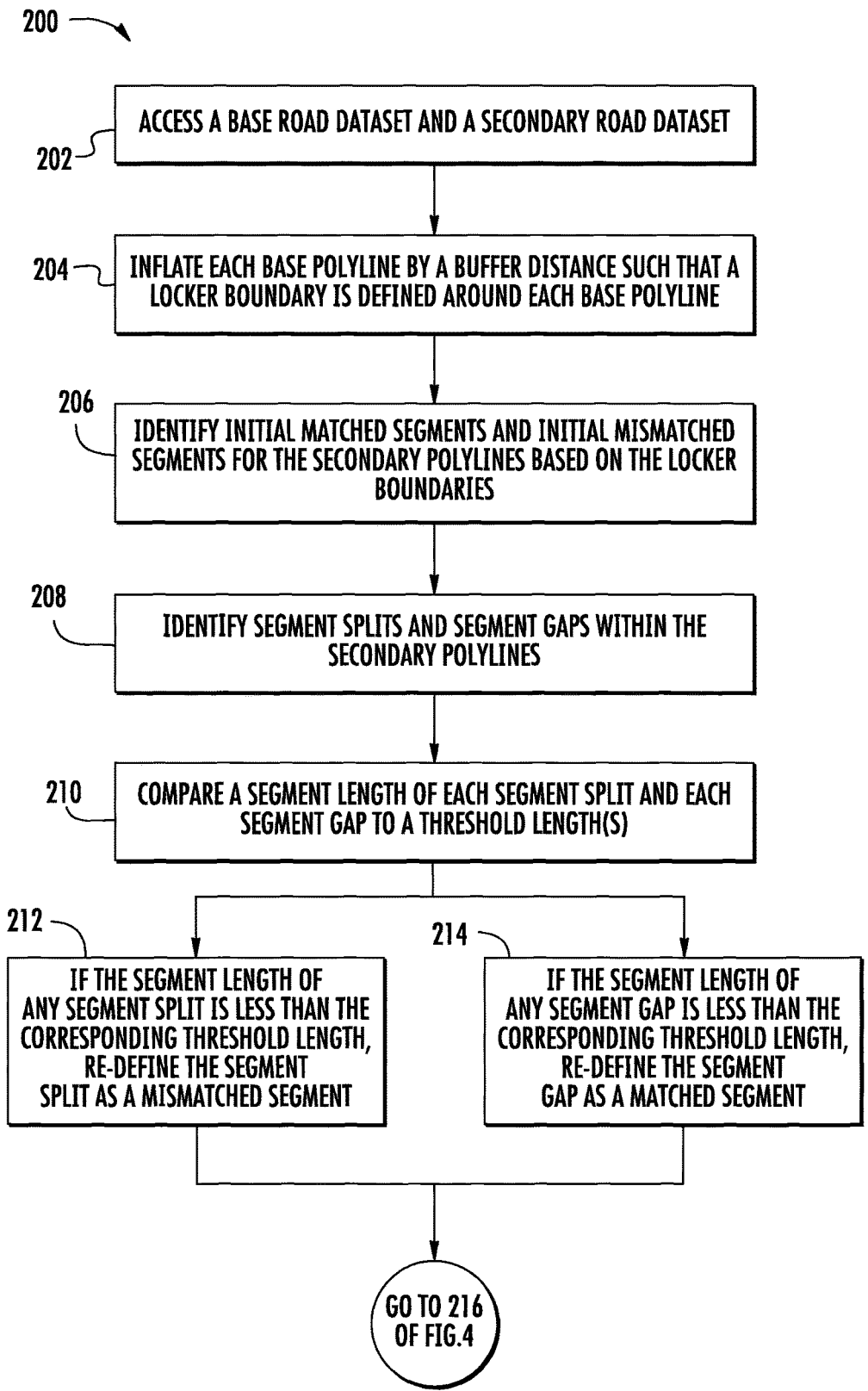
FIG. 3 illustrates a portion of a flow diagram of one embodiment of a method for conflating datasets in accordance with aspects of the present subject matter.
Figure 4:
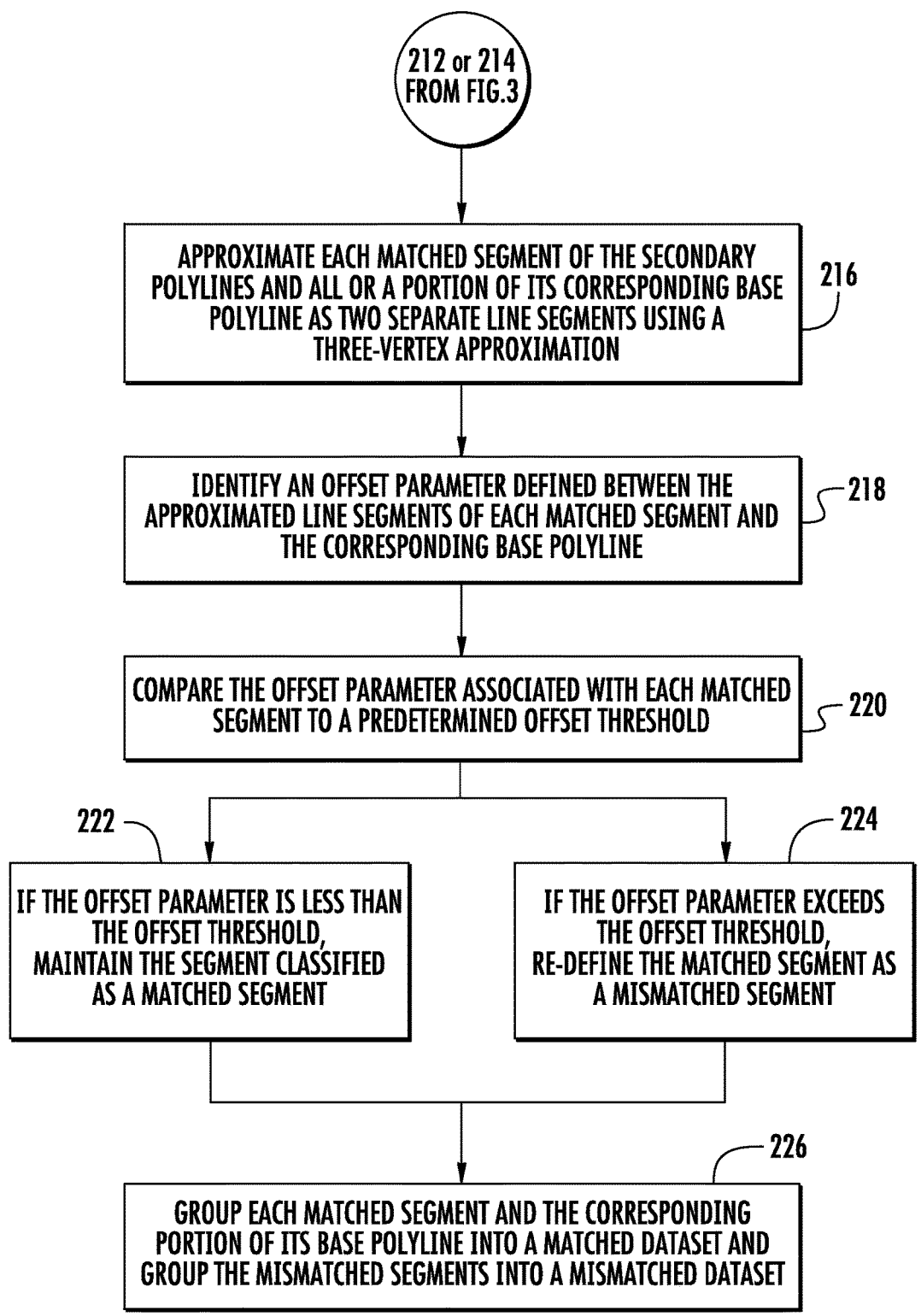
FIG. 4 illustrates the remaining portion of the flow diagram shown in FIG. 3.

Referring now to FIGS. 3 and 4, a flow diagram of one embodiment of a method 200 for conflating datasets is illustrated in accordance with aspects of the present subject matter. The method 200 will generally be discussed herein with reference to the system 100 shown in FIG. 2. However, those of ordinary skill in the art, using the disclosures provided herein, should appreciate that the methods described herein may be executed by any computing device or any combination of computing devices. Additionally, it should be appreciated that, although the method blocks 202-226 are shown in FIGS. 3 and 4 in a specific order, the various blocks of the method 200 may generally be performed in any suitable order that is consistent with the disclosure provided herein.

In general, the disclosed method 200 may allow for a base road dataset including any number of base polylines corresponding to existing roads within a geographic area to be conflated with a different or secondary road dataset have any number of secondary polylines. However, for purposes of explanation, the method 200 will generally be described below with reference to the evaluation of one or more secondary polylines with reference to a single base polyline in order to determine whether any portion(s) of such secondary polyline(s) constitutes a match(es) with the corresponding base polyline. For instance, the various method blocks shown in FIG. 3 (e.g., blocks 202-214) will generally be described with reference to FIGS. 5-8, which illustrate a base polyline 300 corresponding to an existing road and example secondary polylines 302, 304 (e.g., a first polyline 302 and a second polyline 304) to be conflated with the base polyline 300. Similarly, the various method blocks shown in FIG. 4 (e.g., blocks 216-226) will generally be described with reference to FIGS. 9-12, which illustrates a base polyline 300 corresponding to an existing road and an example secondary polyline (e.g., polyline 402 in FIGS. 9 and 10 and polyline 502 in FIGS. 11 and 12) to be conflated with the base polyline 300.

Figure 5:
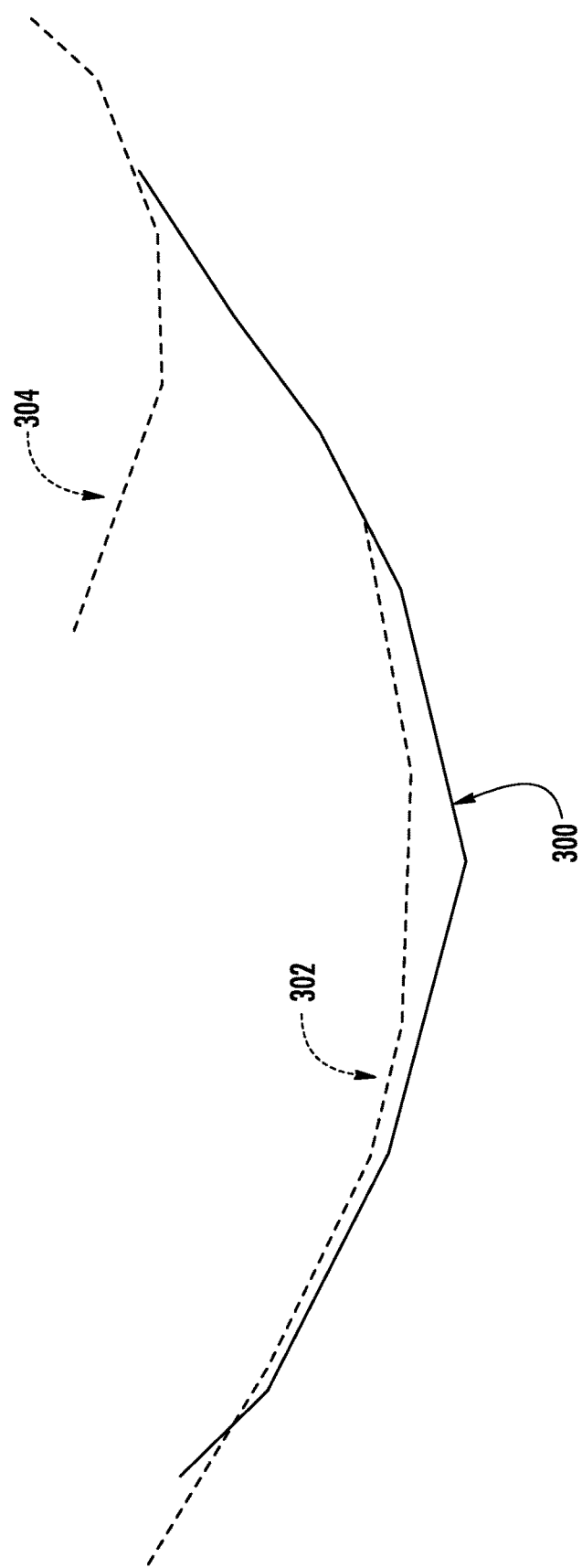
FIG. 5 illustrates an example view of a base polyline of a base road dataset and first and second polylines of a secondary road dataset.

As shown in FIG. 3, at (202), the method 200 includes accessing a base road dataset and a secondary road dataset. As indicated above, the base road dataset may generally correspond to a road dataset including a plurality of geo-coded base polylines, with each base polyline representing a road extending within a given geographic area. Similarly, the secondary road dataset may generally correspond to a road dataset including a plurality of geo-coded secondary polylines, with one or more of the secondary polylines differing from one or more of the base polylines. For instance, FIG. 5 illustrates an example base polyline 300 of a given base road dataset. In addition, FIG. 5 illustrates two example secondary polylines from a given secondary road dataset, namely a first polyline 302 and a second polyline 304. As will be described below, the secondary polylines 302, 304 may be compared and contrasted to the base polyline 300 in order to determine whether any portion of such polylines 302, 304 may be classified as a matched segment(s) to be thereafter associated with the base polyline 300.

It should be appreciated that, in several embodiments, the base road dataset may correspond to an existing road dataset currently being utilized in connection with a GIS (e.g., GIS 124 of FIG. 2) such that each base polyline represents a road that existed and/or was currently in use at the time the base road dataset was collected and/or last updated. In such embodiments, the secondary road dataset may, for example, correspond to a new road dataset that contains more recently collected data such that relatively new roads are included within the secondary road dataset while recently closed roads are not included within such dataset. It should also be appreciated that the base and secondary road datasets may be stored within and/or accessed by any suitable computing device(s). For instance, in one embodiment, both datasets may be input into and/or stored within a given computing device(s) for subsequent retrieval to allow for the disclosed conflation methodologies to be performed.

In several embodiments, one or more of the base polylines analyzed in accordance with the disclosed method 200 may correspond to segments of a longer polyline included within the base road dataset. For example, it may be desirable to segment the base polylines into shorter line segments for comparison to the secondary polyline(s) included within the secondary road dataset. In doing so, the base polylines may be segmented according to any suitable factor and/or criteria. For example, in one embodiment, the base polylines may be segmented according to a given length threshold such that each segmented polyline defines a segment length that is less than the length threshold. Alternatively, in another embodiment, the base polylines may be segmented according to the locations of road intersections, such as by segmenting the base polylines so that each segmented polyline extends from a first intersection location to a second intersection location (or to a road termination). An example of such segmenting is shown in FIG. 1. Specifically, referring to the sideways "T-shaped" intersection contained on the left of the rendered map view 10 shown in FIG. 1, the base polyline(s) representing the road through location 20 may be segmented into two polyline segments (14A, 14B), with the segments being divided from one another at an added intersection at location 20.

Figure 6:
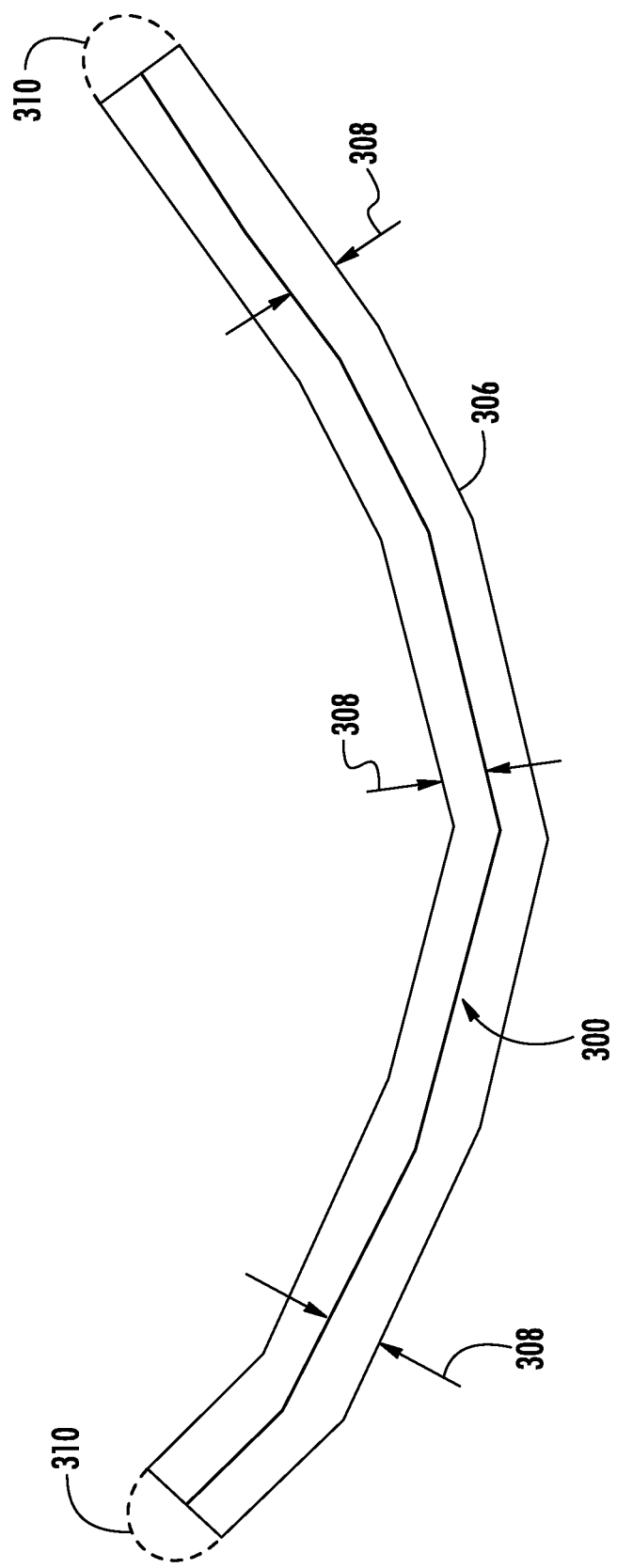
FIG. 6 illustrates an example view of the base polyline shown in FIG. 5 with a locker boundary defined around the base polyline.

At (204), the method 200 includes inflating each base polyline by a buffer distance such that a locker boundary is defined around each of the base polylines. For instance, as shown in FIG. 6, the base polyline 300 has been inflated by defining a locker boundary 306 around the polyline 300 that is spaced apart from the polyline 300 by a given buffer distance 308. As shown in the illustrated embodiment, the locker boundary 306 terminates at the endpoints of the base polyline 300. However, in another embodiment, the locker boundary 306 may be configured to extend beyond the endpoints to provide similar spacing between the polyline 300 and the locker boundary 306 at each endpoint. For instance, as indicated by the dashed lines 310 in FIG. 6, the locker boundary 306 may be curved around each endpoint. In such an embodiment, the radius of curvature of the curved portions of the locker boundary 306 may generally correspond to the buffer distance 308.

It should be appreciated that, in several embodiments, the buffer distance 308 used to define the locker boundary 306 around the base polylines may be the same for each base polyline included within the corresponding base road dataset or may differ between the base polylines based on one or more buffer parameters. For instance, the buffer distance 308 may vary depending on the geographic area within which a given base polyline is located. Specifically, in one embodiment, the buffer distances 308 used for base polylines representing roads extending within a city may be smaller than the buffer distances used for base polylines representing roads extending through rural areas. For example, the buffer distance 308 used for base polylines associated with rural areas may be larger than the buffer distance used for base polylines associated with cities by a given buffer distance factor, such as factor ranging from about 2 to about 10 or from about 4 to about 6 and any other subranges therebetween. The buffer distance 308 may also vary based on any other suitable buffer parameter, such as a confidence score(s) associated with each base polyline, the width of the corresponding road and/or any other suitable parameter(s).

At (206), the method 200 includes identifying initial matched segments and initial mismatched segments for the secondary polylines based on the locker boundaries defined around the based polylines. Specifically, in several embodiments, the secondary road dataset may be overlaid onto the base road dataset to allow the relative locations of the geo-coded base and secondary polylines to be compared. The location of each secondary polyline relative to any adjacent base polylines may then be analyzed to determine if any portion of such polyline is included within one of the locker boundaries of the adjacent base polylines. In doing so, each portion of a secondary polyline that is included within one of the locker boundaries may be defined as an initial matched segment. In contrast, each portion of a secondary polyline that is not included within one of the locker boundaries may be defined as an initial mismatched segment.

Figure 7:
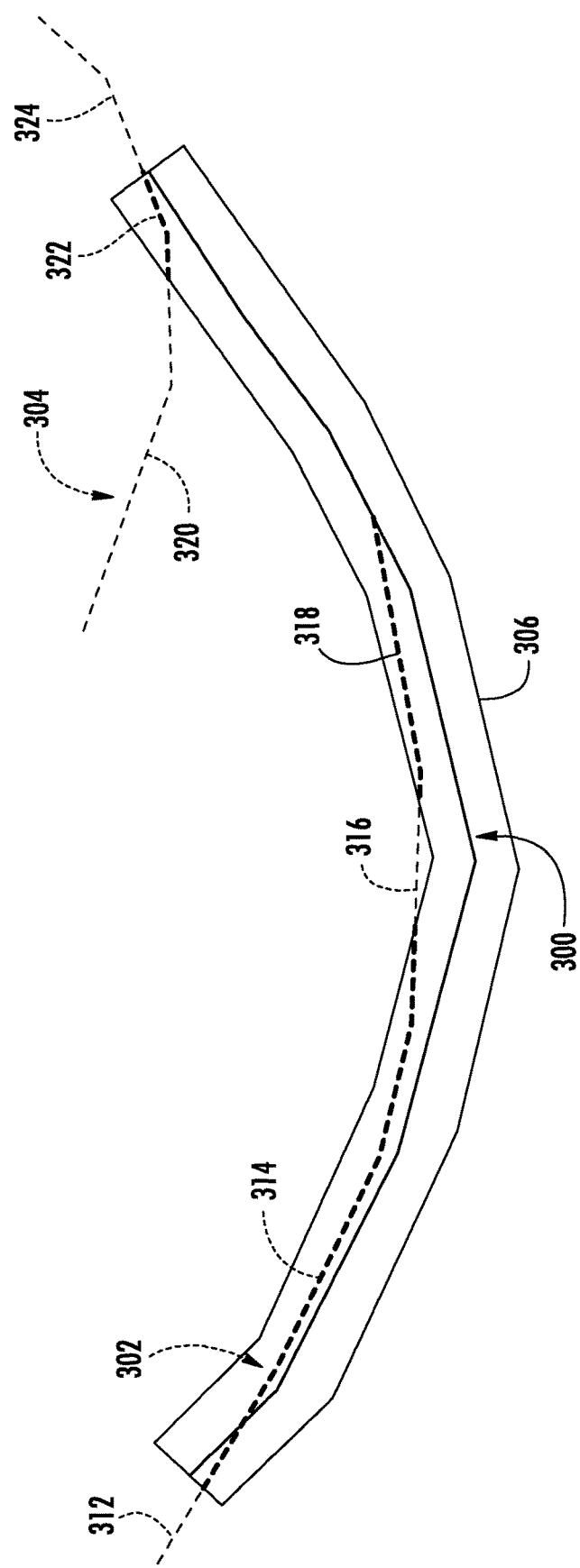
FIG. 7 illustrates an example view of the base polyline and the first and second polylines shown in FIG. 5, particularly illustrating portions of the first and second polylines being identified as an initial matched segment (as indicated by the bolded dashed lines) and/or an initial mismatched segment (as indicated by the non-bolded dashed lines) based on the location of such polylines relative to the locker boundary.

For example, FIG. 7 illustrates the positioning of the example secondary polylines 302, 304 relative to the base polyline 300 after the associated secondary road dataset has been overlaid onto the corresponding base road dataset. As shown in FIG. 7, the first polyline 302 is located relative to the base polyline 300 such that portions of first polyline 302 are included within the associated locker boundary 306 (indicated by the bolded dashed lines) and portions of the first polyline 302 are not included within the locker boundary 306 (indicated by the non-bolded dashed lines). Specifically, the first polyline 302 includes a first segment 312, a second segment 314, a third segment 316 and a fourth segment 318, with the first and third segments 312, 316 extending outside the locker boundary 306, the second segment 314 extending within the locker boundary 306 between the first and third segments 312, 316 and the fourth segment 318 extending within the locker boundary 306 from the end of the third segment 316. In such an embodiment, the first and third line segments 312, 316 for the first polyline 302 may be classified as initial mismatched segments while the second and fourth line segments 314, 318 for the first polyline 302 may be classified as initial matched segments.

Similarly, as shown in FIG. 7, the second polyline 304 is located relative to the base polyline 304 such that a portion of second polyline 304 is included within the associated locker boundary 306 (indicated by the bolded dashed lines) and portions of the second polyline 304 are not included within the locker boundary 306 (indicated by the non-bolded dashed lines). Specifically, the second polyline 304 includes a first segment 320, a second segment 322 and a third segment 324, with the first and third segments 320, 324 extending outside the locker boundary 306 and the second segment 322 extending within the locker boundary 306 between the first and third segments 320, 324. In such an embodiment, the first and third line segments 320, 324 for the second polyline 304 may be classified as initial mismatched segments while the second line segment 322 for the second polyline 304 may be classified as an initial matched segment.

Referring back to FIG. 3, at (208), the method 200 includes identifying any segment splits and/or any segment gaps included within the secondary polylines. As used herein, a "segment split" generally corresponds to a line segment of a secondary polyline that was initially classified as an initial matched segment (i.e., due to such segment being included within the associated locker boundary) but that extends directly from at least one line segment of the same secondary polyline that was initially classified as an initial mismatched segment (i.e., due to such segment(s) not being included within the associated locker boundary). For instance, in the example shown in FIG. 7, the second line segment 314 of the first polyline 302 extends from an initial mismatched segment (i.e., the first and third line segments 312, 316), the fourth line segment 318 of the first polyline 302 extends from an initial mismatched segment (i.e., the third line segment 316) and the second line segment 322 of the second polyline 304 extends from an initial mismatched segment (i.e., the first and third line segments 320, 322). Thus, such line segments 314, 318, 322 may be identified as segment splits.

Similarly, as used herein, a "segment gap" generally corresponds to a line segment of a secondary polyline that was initially classified as an initial mismatched segment (i.e., due to such segment not being included within the associated locker boundary) that extends from at least one line segment of the same secondary polyline that was initially classified as an initial matched segment (i.e., due to such segment(s) being included within the associated locker boundary). For instance, in the example shown in FIG. 7, the first line segment 312 of the first polyline 302 extends from an initial matched segment (i.e., the second line segment 314), the third line segment 316 of the first polyline 302 extends between two initial matched segments (i.e., the second and fourth line segments 314, 318) and both the first and third line segments 320, 324 of the second polyline 304 extend from an initial matched segment (i.e., the second line segment 322). Thus, such line segments 312, 316, 320, 324 may be identified as segment gaps.

Referring back to FIG. 3, at (210), the method 200 includes comparing a segment length of each segment split and each segment gap to a threshold length(s). In several embodiments, if the segment length of any segment split is less than the corresponding threshold length, the segment split may, at (212) be re-classified or re-defined as a mismatched segment. However, for segment splits defining lengths that exceed the corresponding threshold length, the classification of such segment splits may be maintained as matched segments. Similarly, if the segment length of any segment gap is less than the corresponding threshold length, the segment gap may, at (214) be re-classified or re-defined as a matched segment. However, for segment gaps defining lengths that are greater than the corresponding threshold length, the classification of such segment gaps may be maintained as mismatched segments.

Figure 8:
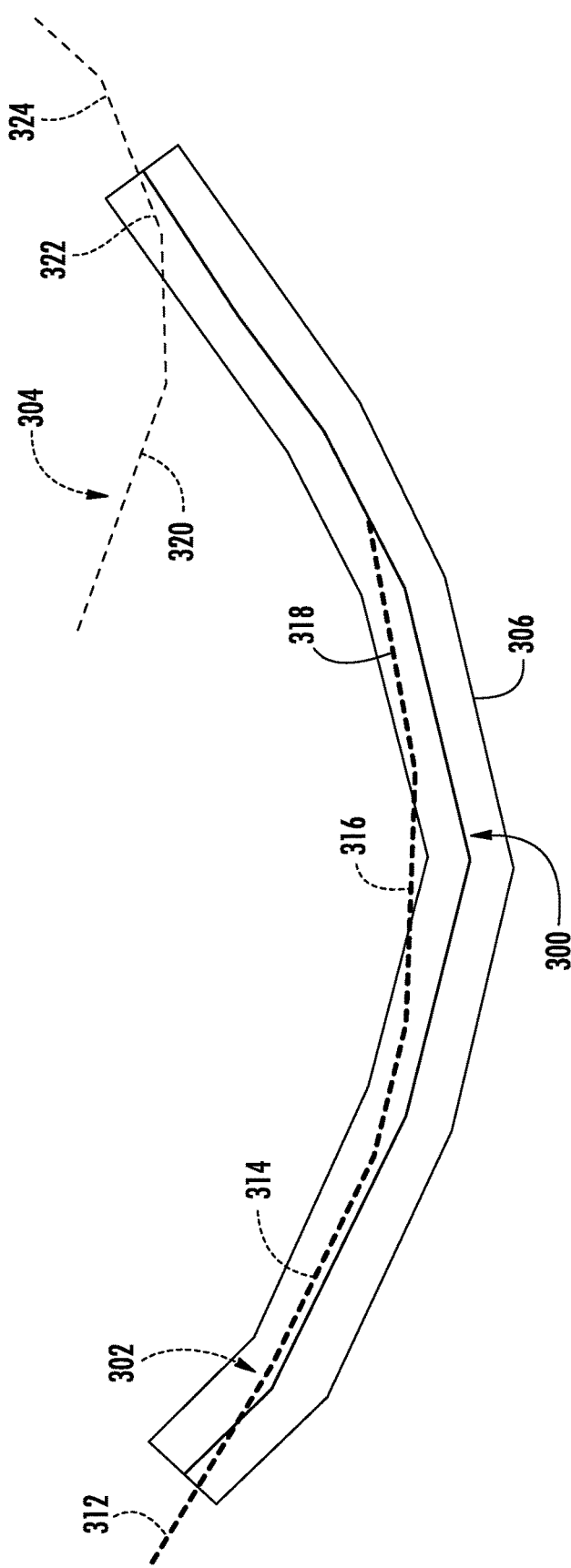
FIG. 8 illustrates an example view of the base polyline and the first and second polylines shown in FIG. 5, particularly illustrating portions of the first and second polylines being identified as matched segments (as indicated by the bolded dashed lines) and/or mismatched segments (as indicated by the non-bolded dashed lines) after classifying any short segment splits of the first and second polylines as mismatched segments and any short segment gaps of the first and second polylines as matched segments.

For example, FIG. 8 illustrates the polylines 300, 302, 304 shown in FIG. 7 after application of the corresponding method blocks 210-214 shown in FIG. 3. Specifically, as indicated above, the second and fourth line segments 314, 318 of the first polyline 302 and the second line segment 322 of the second polyline 304 may be considered segment splits. Additionally, it may be assumed for purposes of description that the second and fourth line segments 314, 318 of the first polyline 302 each define a segment length (i.e., measured along each line segment between its endpoints) that is greater than the corresponding threshold length while the second line segment 322 of the second polyline 304 defines a segment length that is less than the threshold length. Thus, as shown in FIG. 8, the second and fourth line segments 314, 318 of the first polyline 302 are maintained as matched segments (as indicated by the bolded dashed lines). However, given its short segment length, the second line segment 322 of the second polyline 304 is re-defined as a mismatched segment (indicated by the non-bolded dashed lines).

Similarly, as indicated above, the first and third line segments 312, 316, 320, 324 of both the first and second polylines 302 304 may be considered segment gaps. For purposes of illustration, it has been assumed that the first and third line segments 312, 316 of the first polyline 302 each define a segment length (i.e., measured along each line segment between its endpoints) that is less than the corresponding threshold length while the first and third line segments, 320, 324 of the second polyline 304 each define a segment length that is greater than the threshold length. Thus, as shown in FIG. 8, the first and third line segments 312, 316 of the first polyline 302 have been re-defined as matched segments (as indicated by the bolded dashed lines). However, given their longer segment lengths, the first and third segments, 320, 324 of the second polyline 304 remain classified as mismatched segments (as indicated by the non-bolded dashed lines).

It should be appreciated that, in general, the threshold length may correspond to any suitable length(s) that provides both for the classification of shorter segment splits and longer segment gaps (e.g., resulting from noise and/or other inaccuracies in the data) as mismatched segments and for the classification of longer segment splits and shorter segments gaps that otherwise appear match the corresponding base polyline(s) as matched segments. In several embodiments, the threshold length may be selected as a function of the buffer distance 308 used to define the locker boundaries 306. For instance, in one embodiment, the threshold length may be equal to the buffer distance 308 or may correspond to the buffer distance multiplied by a given threshold factor, such as a factor ranging from 1 to 5 or from 2 to 4 or any other subranges therebetween.

In other embodiments, the threshold length may be selected as a function of the buffer distance 308 and/or a segment length of the corresponding base polyline being analyzed with respect to the particular segment split(s) and/or segment gap(s), which may allow for the threshold length to be adjusted in the case of any base polyline(s) defining a relatively short segment length (i.e., the length measured along such polyline between its endpoints). For example, in a particular embodiment, the threshold length may be determined according to the following equation:

$$TL = \min\left(\max\left(\frac{SL_{base}}{4}, BD\right), 3*BD\right)$$

wherein, TL corresponds to the threshold length, $SL_{base}$ corresponds to the segment length of the associated base polyline and BD corresponds to the buffer distance 308 used to define the locker boundary 306 for the associated base polyline.

It should also be appreciated that, in one embodiment, the threshold length used for assessing the segment splits may be the same as the threshold length used to assess the segment gaps. Alternatively, the threshold length used to assess the segment splits may differ from the threshold length used to assess the segment gaps.

Referring now to FIG. 4, at (216), the method 200 includes approximating each matched segment included within the secondary polylines and all or a portion of its corresponding base polyline as two separate line segments using a three-vertex approximation. Specifically, upon filtering out the shorter segment splits and the longer segment gaps, each remaining "matched" segment forming part of one of the secondary polylines may be approximated as a first line segment and a second line segment by identifying the endpoints of such matched segment and by defining a line segment extending from each endpoint to a midpoint defined between the endpoints along the matched segment. In addition, the endpoints of each matched segment may be projected onto the corresponding base polyline in order to identify a base midpoint defined along the base polyline between the projected endpoints. The portion of the base polyline extending between the projected endpoints may then be similarly approximated as a first base line segment and a second base line segment.

Figure 9:
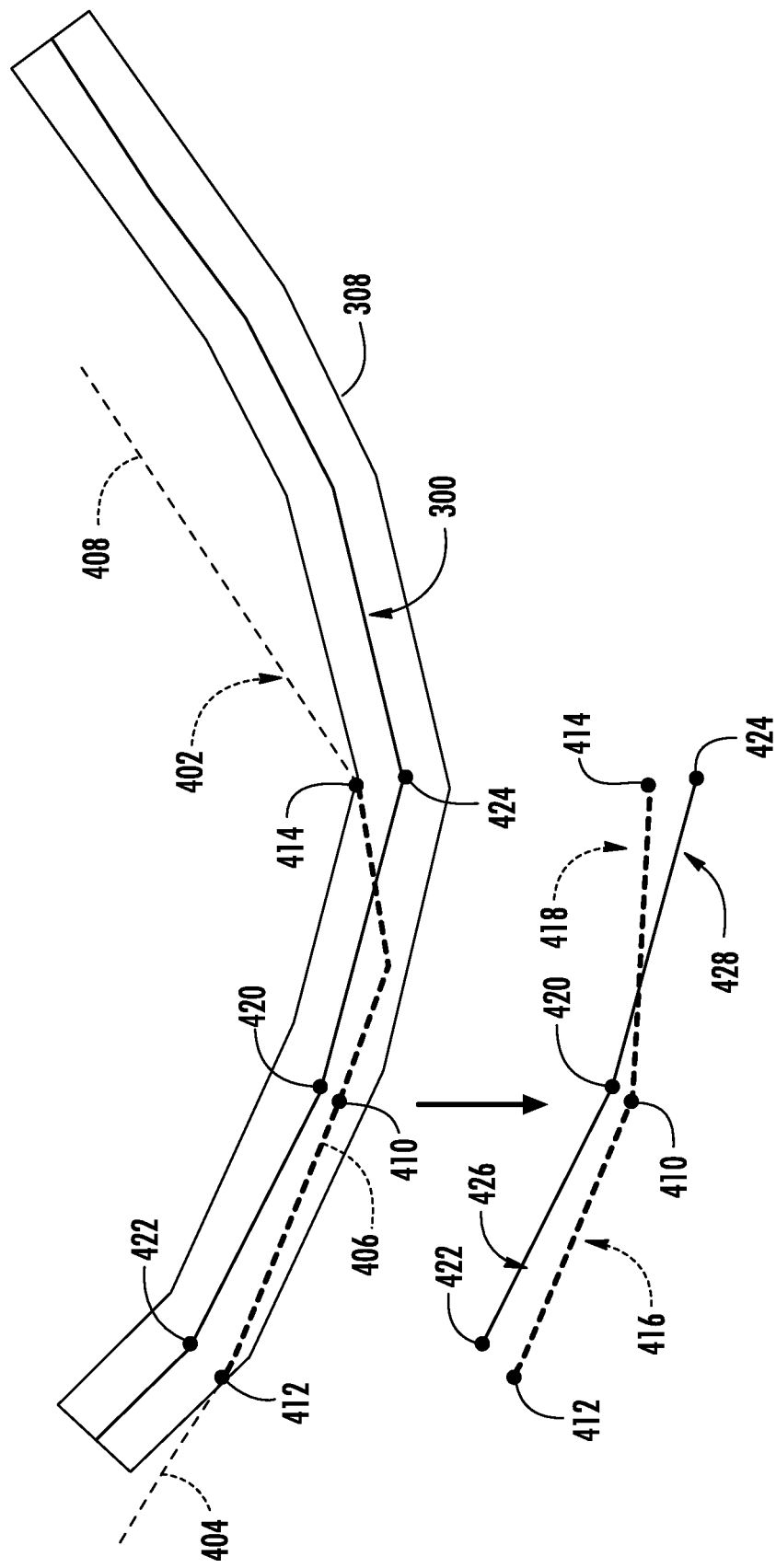
FIG. 9 illustrates an example view of a base polyline of a base road dataset and a secondary polyline of a secondary road dataset, particularly illustrating a matched segment of the secondary polyline and a corresponding portion of the base polyline each being approximated as two separate line segments using a three-vertex approximation.

For example, FIG. 9 illustrates the positioning of an example secondary polyline 402 relative to a given base polyline 300 after the associated secondary road dataset has been overlaid onto the corresponding base road dataset. As shown, the secondary polyline 402 includes a first line segment 404, a second line segment 406 and a third line segment 408, with the first and third line segments 404, 408 extending outside of the associated locker boundary 306 and the second line segment 406 extending within the locker boundary 306. Additionally, as shown, the second line segment 406 corresponds to a matched segment (as indicated by the bolded dashed lines) and the first and third line segments 404, 408 correspond to mismatched segments. For instance, the second line segment 406 may define a segment length that is longer than the threshold length used for assessing segment gaps and, thus, its classification may be maintained as a matched segment through method blocks 210-214 described above. Similarly, the first and third line segments 404, 408 may each define a segment length that is greater than the threshold length use for assessing segment splits and, thus, the classification of such line segments 404, 408 may be maintained as a mismatched segment through method blocks 210-214 described above.

As shown in FIG. 9, to approximate the matched segment (i.e., the second line segment 406) as two separate line segments using the disclosed three-vertex approximation, a midpoint 410 may be defined for the second line segment 406 such that the segment lengths extending along the line segment 406 between the midpoint 410 and each of its endpoints 412, 414 are equal. The second line segment 406 may then be approximated as two separate line segments (as shown directly below the polylines 300, 403), with a first approximated line segment 416 extending between one of the endpoints 412 and the midpoint 410 and a second approximated line segment 418 extending between the midpoint 410 and the other endpoint 414.

The endpoints 412, 414 used to define the first and second approximated line segments 416, 418 may then be projected onto the corresponding base polyline 300 to allow such polyline to be similarly approximated as two separate line segments. Specifically, as shown in FIG. 9, endpoint 422 may correspond to the projection of endpoint 412 onto the base polyline 300 and endpoint 424 may correspond to the projection of endpoint 414 onto the base polyline 300. A base midpoint 420 may then be defined for the portion of the base polyline 300 extending between the endpoints 422, 424. Such points 420, 422, 424 may then serve as the basis for approximating the corresponding portion of the base polyline 300 as a first base segment 426 extending between one of the endpoints 422 and the midpoint 420 and a second base segment 428 extending between the midpoint 420 and the other endpoint 424.

Figure 11:
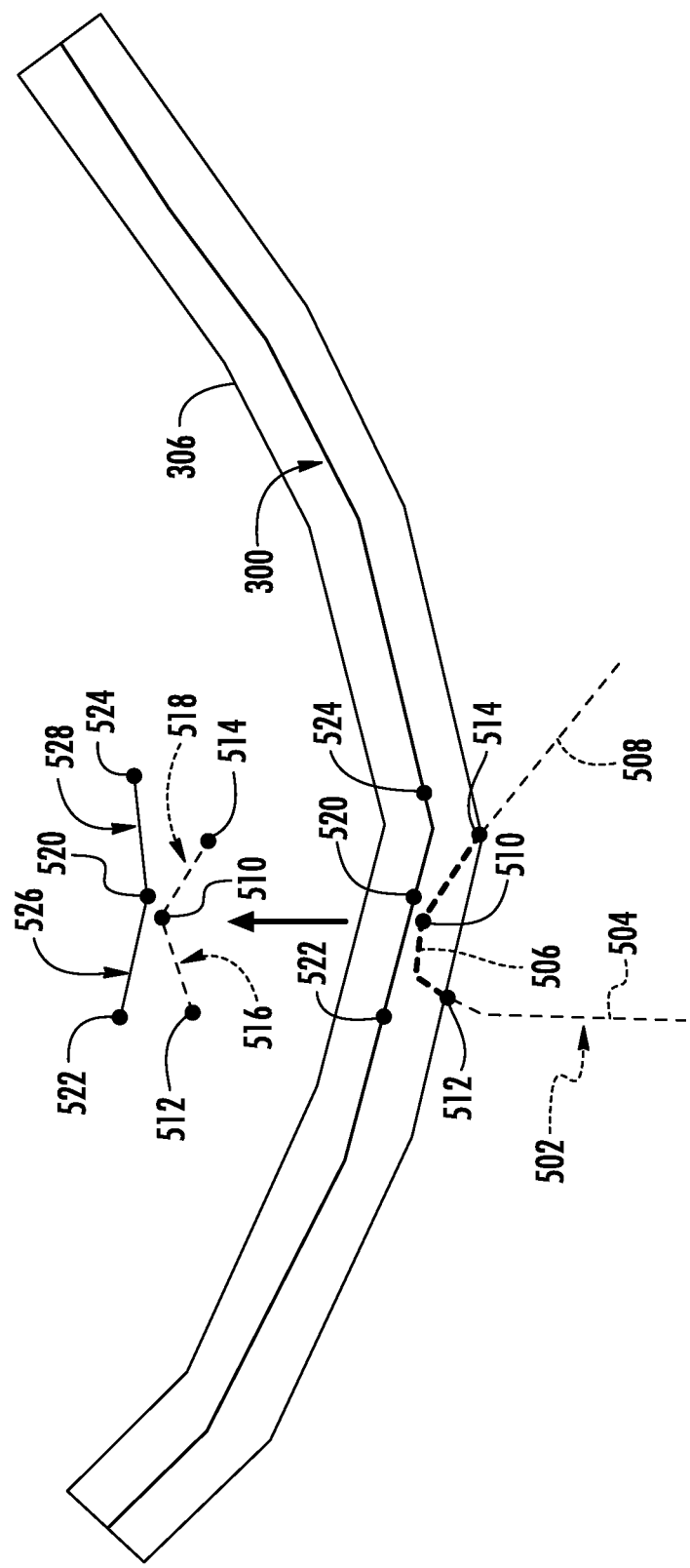
FIG. 11 illustrates another example view of a base polyline of a base road dataset and a secondary polyline of a secondary road dataset, particularly illustrating a matched segment of the secondary polyline and a corresponding portion of the base polyline each being approximated as two separate line segments using a three-vertex approximation.

The same three-vertex approximation may also be utilized to approximate the polylines 300, 502 shown in FIG. 11. Specifically, FIG. 11 illustrates the positioning of another example secondary polyline 502 relative to a given base polyline 300 after the associated secondary road dataset has been overlaid onto the corresponding base road dataset. As shown, the secondary polyline 502 includes a first line segment 504, a second line segment 506 and a third line segment 508, with the first and third line segments 504, 508 extending outside of the associated locker boundary 306 and the second line segment 506 extending within the locker boundary 306. Additionally, as shown, the second line segment 506 corresponds to a matched segment (as indicated by the bolded dashed lines) and the first and third line segments 504, 508 correspond to mismatched segments. For instance, the second line segment 504 may define a segment length that is longer than the threshold length used for assessing segment gaps and, thus, its classification may be maintained as a matched segment through method blocks 210-214 described above. Similarly, the first and third line segments 504, 508 may each define a segment length that is greater than the length threshold used for assessing segment splits and, thus, the classification of such line segments 504, 508 may be maintained as a mismatched segment through method blocks 210-214 described above.

As shown in FIG. 11, to approximate the matched segment (i.e., the second line segment 506) as two separate lines segments using the disclosed three-vertex approximation, a midpoint 510 may be defined for the second line segment 506 such that the segment lengths extending along the line segment 506 between the midpoint 510 and each of its endpoints 512, 514 are equal. The second line segment 506 may then be approximated as two separate line segments (as shown directly above the polylines 300, 502), with a first approximated line segment 516 extending between one of the endpoints 512 and the midpoint 510 and a second approximated line segment 518 extending between the other endpoint 514 and the midpoint 510.

The endpoints 512, 514 used to define the first and second approximated line segments 516, 518 may then be projected onto the corresponding base polyline 300 to allow such polyline 300 to be similarly approximated as two separate line segments. Specifically, as shown in FIG. 11, endpoint 522 may correspond to the projection of endpoint 512 onto the base polyline 300 and endpoint 524 may correspond to the projection of endpoint 514 onto the base polyline 300. A base midpoint 520 may then be defined for the portion of the base polyline 300 extending between the endpoints 522, 524. Such points 520, 522, 524 may then serve as the basis for approximating the corresponding portion of the base polyline 300 as a first base segment 526 extending between one of the endpoints 522 and the midpoint 520 and a second base segment 528 extending between the midpoint 520 and the other endpoint 524.

It should be appreciated that, in alternative embodiments, the disclosed three-vertex approximation may be achieved using any other suitable methodology or process. For instance, in another embodiment, all three points defined along each matched segment (e.g., the two endpoints and the midpoint) may be projected onto the corresponding base polyline to allow such polyline to be approximated as two separate line segments.

Referring back to FIG. 4, at (218), the method 200 includes identifying an offset parameter defined between the approximated line segments of each matched segment and its corresponding base polyline. In general, the offset parameter may correspond to any dimensional parameter and/or any other suitable parameter that may be utilized to compare and contrast the approximated line segments. For instance, in one embodiment, the offset parameter may correspond to an offset angle defined between each pair of corresponding line segments. In addition, or as an alternative thereto, the offset parameter may correspond to an offset distance defined between each corresponding pair of segment midpoints.

Figure 10:
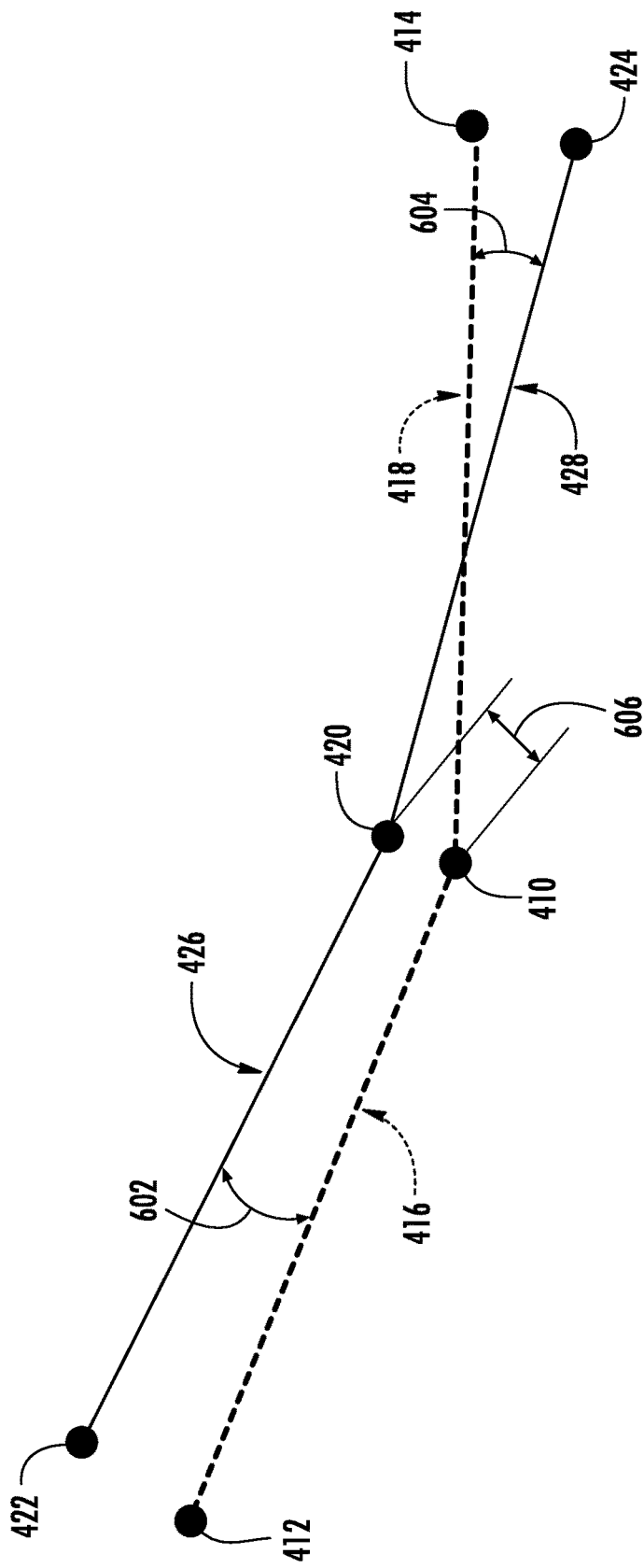
FIG. 10 illustrates a close-up view of the approximated line segments shown in FIG. 9.
Figure 12:
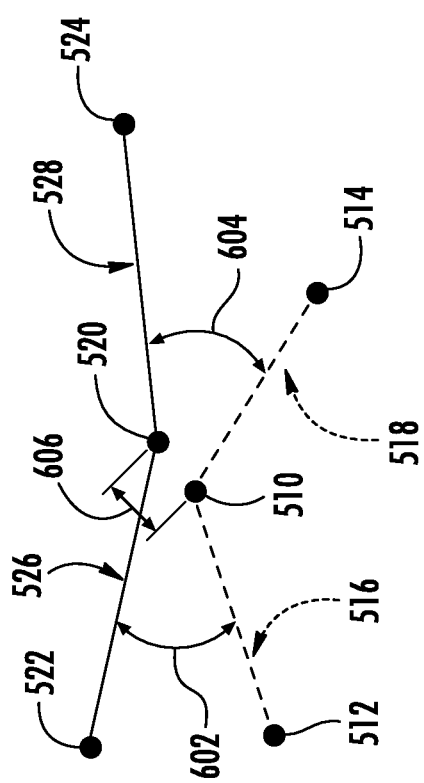
FIG. 12 illustrates a close-up view of the approximated line segments shown in FIG. 10.

For example, FIG. 10 illustrates a magnified view of the approximated line segments 426, 428, 416, 418 for the base polyline 300 and the matched segment 406 of the secondary polyline 402 shown in FIG. 9. Similarly, FIG. 12 illustrates a magnified view of the approximated line segments 526, 528, 516, 518 for the base polyline 300 and the matched segment 506 of the secondary polyline 502 shown in FIG. 11. As shown in FIGS. 10 and 12, an offset angle 602, 604 may be defined between each corresponding pair of line segments. Specifically, a first offset angle 602 may be defined between each first approximated line segment 416, 516 and its corresponding first base line segment 426, 526 and a second offset angle 604 may be defined between each second approximated line segment 418, 518 and its corresponding second base line segment 428, 528. Additionally, as shown in FIGS. 10 and 12, an offset distance 606 may be defined between each pair of midpoints 410, 420, 510, 520 for the approximated line segment. As will be described below, the offset angle(s) 602, 604 and/or the offset distance 606 may be used as a means for determining whether the matched segment should be re-defined as a mismatched segment or maintained as a matched segment for purposes of associating such portion of the secondary polyline with the corresponding base polyline.

Referring back again to FIG. 4, at (220), the method 200 includes comparing the offset parameter associated with each matched segment to a predetermined offset threshold. In several embodiments, if the offset parameter is less than the offset threshold for a given matched segment, the classification for such segment may, at (222), be maintained as a matched segment. However, if the offset parameter is greater than the offset threshold for any matched segment, the matched segment may, at (224) be re-classified or re-defined as a mismatched segment.

For example, in one embodiment, an offset angle threshold may be defined for the offset angles 602, 604 defined between the approximated line segments and an offset distance threshold may be defined for the offset distance 606 defined between the corresponding midpoints. In such an embodiment, if one of the offset angles 602, 604 exceeds the offset angle threshold or if the offset distance 606 exceeds the offset distance threshold, the associated matched segment may be redefined as a mismatched segment. However, if both offset angles 602, 604 are less than the offset angle threshold and the offset distance 606 is less than offset distance threshold, the matched segment may maintain its classification as a matched segment.

It should be appreciated that the specific threshold amounts selected for assessing the approximated line segments may generally vary depending on or more suitable factors. However, in one embodiment, the offset angle threshold may correspond to an angle ranging from about 20 degrees to about 40 degrees, such as from about 25 degrees to about 35 degrees and any other subranges therebetween. Similarly, in one embodiment, the offset distance threshold may correspond to a distance equal to the buffer distance 308 or the buffer distance 308 multiplied by a given threshold factor, such as a factor ranging from 0.5 to 3 or from 1 to 2 and/or any other subranges therebetween.

Additionally, at (226), the method 200 includes grouping each matched segment defined by a secondary polyline and the corresponding portion of its base polyline into a matched dataset and grouping each mismatched segment defined by a secondary polyline into a mismatched database. Specifically, in several embodiments, upon filtering out the shorter segment splits and the longer segment gaps and assessing the approximated line segments as described above, any portion of a secondary polyline that remains classified as a matched segment may be grouped with the corresponding portion of the polylines included within the base dataset while the portion(s) of the secondary polylines that are classified as mismatched segments may be grouped into a separate dataset. Such separate datasets may then be stored within a suitable computing device(s) and/or further processed as desired. For instance, as indicated above, it may be desirable to have personnel manually perform any tasks related to the matched dataset and/or unmatched dataset that require human judgment.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for conflating geospatial asset data associated with a geographic area, the geospatial asset data including a base road dataset and a secondary road dataset, the base road dataset including a plurality of base polylines and the secondary road dataset including a plurality of secondary polylines, the method comprising:

defining, by one or more computing devices, an individual locker boundary around each of the plurality of base polylines, the plurality of base polylines corresponding to road segments contained within the geographic area;

identifying, by the one or more computing devices, a plurality of initial matched road segments and a plurality of initial mismatched road segments for the plurality of secondary polylines, wherein each portion of the plurality of secondary polylines that is included within one of the locker boundaries is defined as an initial matched road segment and each portion of the plurality of secondary polylines that is not included within one of the locker boundaries is defined as an initial mismatched road segment;

identifying, by the one or more computing devices, a segment split within the plurality of secondary polylines, the segment split corresponding to an initial matched road segment that extends from at least one initial mismatched road segment defined along the same secondary polyline;

comparing, by the one or more computing devices, a segment length of the segment split to a threshold length; and if the segment length is less than the threshold length, re-defining, by the one or more computing devices, the segment split as a mismatched road segment.

2. The computer-implemented method of claim 1, wherein the locker boundary defines a buffer distance, wherein the threshold length is determined as a function of the buffer distance.

3. The computer-implemented method of claim 2, wherein the threshold length is determined as a function of both the buffer distance and a base segment length of the base polyline associated with the segment split.

4. The computer-implemented method of claim 1, the method further comprising:

identifying an offset parameter defined between a first initial matched road segment of the plurality of initial matched road segments and a corresponding base polyline of the plurality of base polylines using a three-vertex approximation; and if the offset parameter exceeds a predetermined offset threshold, defining, the first initial matched road segment as a mismatched road segment.

5. The computer-implemented method of claim 4, the method thither comprising approximating the first initial matched road segment as a first line segment and a second line segment, the first and second line segments extending from a midpoint; and approximating all or a portion of the corresponding base polyline as a first base line segment and a second base line segment, the first and second base line segments extending from a base midpoint.

6. The computer-implemented method of claim 5, wherein the offset parameter comprises offset angles defined between the approximations of the first initial matched road segment and the corresponding base polyline, the method further comprising:

identifying a first offset angle defined between the first line segment and the first base line segment;

identifying a second offset angle defined between the second line segment and the second base line segment; and if the first offset angle or the second offset angle exceeds the offset threshold, defining the first initial matched road segment as a mismatched road segment.

7. The computer-implemented method of claim 5, wherein the offset parameter comprises an offset distance defined between the midpoint and the base midpoint, further comprising defining the first initial matched road segment as a mismatched road segment if the offset distance exceeds the offset threshold.

8. A computer-implemented method for conflating geospatial asset data associated with a geographic area, the geospatial asset data including a base road dataset and a secondary road dataset, the base road dataset including a plurality of base polylines and the secondary road dataset including a plurality of secondary polylines, the method comprising:

defining, by one or more computing devices, an individual locker boundary around each of the plurality of base polylines, the plurality of base polylines corresponding to road segments contained within the geographic area;

identifying, by the one or more computing devices, a plurality of initial matched road segments and a plurality of initial mismatched road segments for the plurality of secondary polylines, wherein each portion of the plurality of secondary polylines that is included within one of the locker boundaries is defined as an initial matched road segment and each portion of the plurality of secondary polylines that is not included within one of the locker boundaries is defined as an initial mismatched road segment;

identifying, by the one or more computing devices, a segment gap within the plurality of secondary polylines, the segment gap corresponding to an initial mismatched road segment that extends from at least one initial matched road segment defined along the same secondary polyline;

comparing, by the one or more computing devices, a segment length of the segment gap to a threshold length; and if the segment length is less than the threshold length, re-defining, by the one or more computing devices, the segment gap as a matched road segment.

9. The computer-implemented method of claim 8, wherein the locker boundary defines a buffer distance, wherein the threshold length is determined as a function of the buffer distance.

10. The computer-implemented method of claim 8, wherein the threshold length is determined as a function of both the buffer distance and a base segment length of the base polyline associated with the segment split.

11. The computer-implemented method of claim 8, the method further comprising:

identifying an offset parameter defined between a first initial matched road segment of the plurality of initial matched road segments and a corresponding base polyline of the plurality of base polylines using a three-vertex approximation; and if the offset parameter exceeds a predetermined offset threshold, defining, the first initial matched road segment as a mismatched road segment.

12. The computer-implemented method of claim 11, the method further comprising:

approximating, the first initial matched road segment as a first line segment and a second line segment, the first and second line segments extending from a midpoint; and approximating all or a portion of the corresponding base polyline as a first base line segment and a second base line segment, the first and second base line segments extending from a base midpoint.

13. The computer-implemented method of claim 12, wherein the offset parameter comprises offset angles defined between the approximations of the first initial matched road segment and the corresponding base polyline, the method further comprising:

identifying a first offset angle defined between the first line segment and the first base line segment;

identifying a second offset angle defined between the second line segment and the second base line segment; and if the first offset angle or the second offset angle exceeds the offset threshold, defining the first initial matched road segment as a mismatched road segment.

14. The computer-implemented method of claim 12, wherein the offset parameter comprises an offset distance defined between the midpoint and the base midpoint, further comprising defining the first initial matched road segment as a mismatched road segment if the offset distance exceeds the offset threshold.

15. A computer-implemented method for conflating geospatial asset data associated with a geographic area, the geospatial asset data including a base road dataset and a secondary road dataset, the base road dataset including a plurality of base polylines and the secondary road dataset including a plurality of secondary polylines, the method comprising:

defining, by one or more computing devices, an individual locker boundary around each of the plurality of base polylines, the plurality of base polylines corresponding to road segments contained within the geographic area;

identifying, by the one or more computing devices, a plurality of initial matched road segments and a plurality of initial mismatched road segments for the plurality of secondary polylines, wherein each portion of the plurality of secondary polylines that is included within one of the locker boundaries is defined as an initial matched road segment and each portion of the plurality of secondary polylines that is not included within one of the locker boundaries is defined as an initial mismatched road segment;

identifying, by the one or more computing devices, an offset parameter defined between a first initial matched road segment of the plurality of initial matched road segments and a corresponding base polyline of the plurality of base polylines using a three-vertex approximation; and if the offset parameter exceeds a predetermined offset threshold, defining the first initial matched road segment as a mismatched road segment.

16. The computer-implemented method of claim 15, the method further comprising:

approximating the first initial matched road segment as a first line segment and a second line segment, the first and second line segments extending from a midpoint;

approximating all or a portion of the corresponding base polyline as a first base line segment and a second base line segment, the first and second base line segments extending from a base midpoint.

17. The computer-implemented method of claim 16, wherein the offset parameter comprises offset angles defined between the approximations of the first initial matched road segment and the corresponding base polyline, the method further comprising:

identifying a first offset angle defined between the first line segment and the first base line segment;

identifying a second offset angle defined between the second line segment and the second base line segment; and if the first offset angle or the second offset angle exceeds the offset threshold, defining the first initial matched road segment as a mismatched road segment.

18. The computer-implemented method of claim 16, wherein the offset parameter comprises an offset distance defined between the midpoint and the base midpoint, further comprising defining the first initial matched road segment as a mismatched road segment if the offset distance exceeds the offset threshold.

19. The computer-implemented method of claim 15, further comprising:
identifying a segment gap within the plurality of secondary polylines, the segment gap corresponding to an initial mismatched road segment that extends from at least one initial matched road segment defined along the same secondary polyline;
comparing a segment length of the segment gap to a threshold length; and
if the segment length is less than the threshold length, re-defining the segment gap as a matched road segment.

20. The computer-implemented method of claim 15, further comprising:
identifying a segment split within the plurality of secondary polylines, the segment split corresponding to an initial matched road segment that extends from at least one initial mismatched road segment defined along the same secondary polyline;
comparing a segment length of the segment split to a threshold length; and
if the segment length is less than the threshold length, re-defining the segment split as a mismatched road segment.

21. The computer-implemented method of claim 1, further comprising grouping each identified matched road and its corresponding base polyline into a matched road dataset and grouping identified mismatched road segments into a mismatched road dataset.

22. The computer-implemented method of claim 8, further comprising grouping each identified matched road and its corresponding base polyline into a matched road dataset and grouping identified mismatched road segments into a mismatched road dataset.

23. The computer-implemented method of claim 15, further comprising grouping each identified matched road and its corresponding base polyline into a matched road dataset and grouping identified mismatched road segments into a mismatched road dataset.

* * * * *